United States Patent [19]
Zauner

[11] Patent Number: 5,522,217
[45] Date of Patent: Jun. 4, 1996

[54] PRESSURE WAVE MACHINE WITH INTEGRATED COMBUSTION AND METHOD FOR COOLING THE ROTOR OF THIS PRESSURE WAVE MACHINE

[75] Inventor: Erwin Zauner, Mannheim, Germany

[73] Assignee: ABB Management AG, Baden, Switzerland

[21] Appl. No.: 274,719

[22] Filed: Jul. 18, 1994

[30] Foreign Application Priority Data

Sep. 6, 1993 [DE] Germany .......................... 43 30 037.5

[51] Int. Cl.[6] ............................... F02C 3/02; F02C 7/12; F23R 7/00
[52] U.S. Cl. ........................................ 60/39.45; 417/64
[58] Field of Search ........................... 417/64; 60/39.45 A

[56] References Cited

U.S. PATENT DOCUMENTS

| | | |
|---|---|---|
| 4,719,746 | 1/1988 | Keller . |
| 4,796,595 | 1/1989 | El-Nashar et al. ............... 417/64 X |
| 5,197,276 | 3/1993 | Keller . |
| 5,267,432 | 12/1993 | Paxson ............................ 417/64 X |
| 5,353,589 | 10/1994 | Althauc et al. ................. 60/39.45 A |

FOREIGN PATENT DOCUMENTS

| | | | |
|---|---|---|---|
| 1034809 | 7/1958 | Germany ............... | 60/39.45 A |
| 1274411 | 11/1963 | Germany . | |
| 1740801 | 6/1992 | U.S.S.R. ................ | 417/64 |

Primary Examiner—Richard E. Gluck
Attorney, Agent, or Firm—Burns, Doane, Swecker & Mathis

[57] ABSTRACT

In a pressure wave machine with integrated combustion, which consists essentially of a rotor (1) which rotates between two side parts (4), (5) and has cells (2) in which an ignition and combustion process takes place repetitively, cooling air conduits (7) are arranged in the casing and passages (3) are arranged in the rotor (1) below and above the cells (2), viewed in the radial direction. The rotor (1) can be additionally surrounded at its inner periphery and outer periphery by at least one sheet-metal guide (8) in order to form further cooling passages (6), the internal space of the pressure wave machine casing being connected to the low-pressure outlet. For cooling the rotor of the pressure wave machine, a small part of the entering air is branched off before the admixture of the fuel, is led through the casing by cooling air conduits (7) and is subsequently guided through the passages (3), the cooling air itself then being subjected to its own pressure wave process.

11 Claims, 4 Drawing Sheets

PRESSURE WAVE MACHINE WITH INTEGRATED COMBUSTION AND METHOD FOR COOLING THE ROTOR OF THIS PRESSURE WAVE MACHINE

BACKGROUND OF THE INVENTION

1. Field of the Invention

The invention relates to a pressure wave machine with integrated combustion and a method for cooling the rotor of this pressure wave machine.

2. Discussion of Background

Compared with turbines which have a steady-state type of operation, the known pressure wave machines, which have a non-steady-state type of operation, have the great advantage that they permit very high hot gas temperatures. This applies particularly to pressure wave machines with integrated constant volume combustion, such as are described— with the associated methods—in U.S. Pat. No. 4,719,746 and U.S. Pat. No. 5,197,276 for example.

Because the cells are periodically subjected to cool air and hot combustion gas, the rotor assumes a material temperature which is substantially less than the hot gas temperature. Nevertheless, problems of excessive rotor temperatures can arise, under certain conditions, even with pressure wave machines. This is so where very high specific powers are demanded and, therefore, very high gas temperatures are necessary or where the pressure wave machine is not equipped with a symmetrical counterflow pressure wave process but is equipped with a wave process which leads to an asymmetrical temperature distribution in the axial direction within the rotor.

The latter is, for example, the case in the parallel flow process in which the outlet end of the rotor is subjected substantially more intensively to hot gas than the inlet end. Because this parallel flow process is advantageous with respect to the design integration of the pressure wave machine in a gas turbine, however, a way must be found of cooling the rotor. The known use of cooling air compressors or an external cooling medium for rotor cooling does, however, involve a relatively large amount of complication for a small effect.

SUMMARY OF THE INVENTION

Accordingly, one object of the invention is to avoid these disadvantages by providing a novel pressure wave machine with integrated combustion and a method by which the rotor is effectively cooled without the aid of cooling air compressors or external cooling media.

This is achieved, according to the invention, in a pressure wave machine, wherein cooling air conduits are arranged in the casing and passages are arranged in the rotor radially inward and radially outward of the cells. Alternatively or in addition the rotor is surrounded at its inner periphery and outer periphery by at least one sheet-metal guide in order to form further cooling passages, the internal space of the pressure wave machine casing being connected to the low-pressure outlet.

In accordance with the invention, this is achieved in a method for cooling the rotor of a pressure wave machine as claimed, wherein a small part of the entering air is branched off before the admixture of the fuel, is led through the casing by cooling air conduits and is subsequently guided through passages located radially inward and outward of the cells, viewed in the radial direction, the cooling air itself being subjected to its own pressure wave process. Alternatively, or in addition, a part of the entering air is branched off before the admixture of the fuel, is led into the rotor inner space and is guided in the cooling passages arranged on the inside and outside of the rotor.

The advantage of the invention consists mainly in the fact that the rotor of the pressure wave machine is cooled effectively and without a large amount of additional design complication.

Furthermore, it is advantageous for separating webs to be present in the cooling passage arranged on the inside and the outside of the rotor. By this means, the cooling effect is matched to the axial temperature distribution.

It is expedient for the cooling air to be extracted after the precompression by the pressure wave and, after it has flowed through the passages, to be then mixed again, as heated cooling air, with the entering air. The cooling air then takes part in the subsequent high-pressure process and a gain can be attained by this means for the thermodynamic process.

In addition, it is advantageous for the magnitude of the cooling effect to be controlled by throttling the cooling air flow and/or by changing the width of the cooling air inlet openings and outlet openings. This permits good matching to the particular actual operating conditions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, which represent embodiment examples of the invention using a pressure wave machine with integrated constant volume combustion and wherein.

DESCRIPTION OF THE PREFERRED EMBODIMENTS

Figure 1:
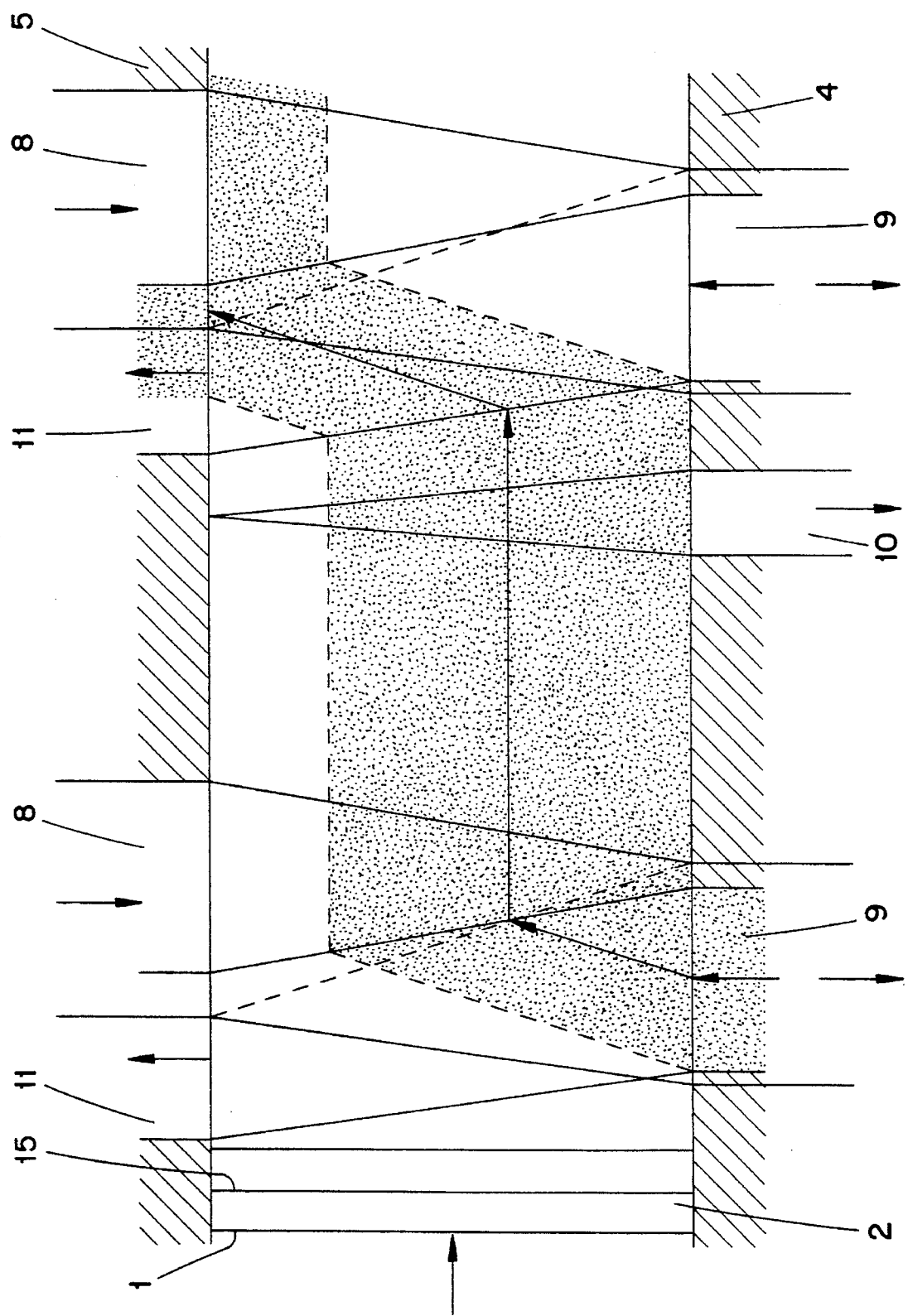
FIG. 1 is a schematic of the pressure wave process of the working gas and the cooling air superimposed by developing a cylindrical section through a pressure wave machine operating on a parallel flow pressure wave process.

Referring now to the drawings, wherein like reference numerals designate identical or corresponding parts throughout the several views, where only the elements essential to understanding the invention are shown and where the flow direction of the working medium is indicated by arrows, the invention is explained in more detail by using embodiment examples and FIGS. 1 to 5.

Pressure wave machines with integrated constant volume combustion and their mode of operation are known per se so that it is not necessary to consider all the details here. In these pressure wave machines, the rotor 1, configured as a cell wheel in accordance with FIG. 1, is located between two side parts 4 and 5 of the stator casing (not shown in any more detail) of the pressure wave machine. The rotor 1 is subdivided into individual cells 2 which are separated from one another by separating walls 15. As is indicated by the left-hand arrow in FIG. 1, the cells 2 rotate relative to the side parts 4 and 5 of the casing. The two side parts 4 and 5 have inlet openings 8 for the fuel/air mixture and outlet openings 9 for the low-pressure hot gas 10, outlet openings 10 for the high-pressure hot gas and outlet openings 11 for the heated cooling air. Both ends of the cells 2 are open so that a fuel/air mixture can penetrate through the inlet opening 8 into the cells 2 and the known pressure wave process can take place.

Figure 2:
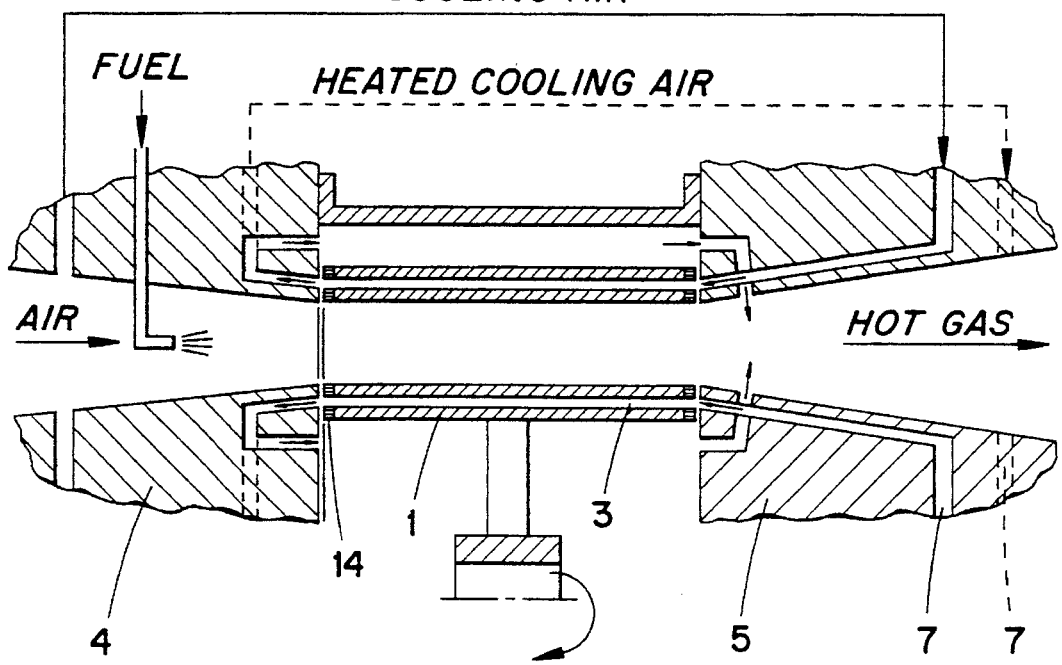
FIG. 2 is a partial longitudinal section through the pressure wave machine with cooling passages in the rotor.
Figure 3:
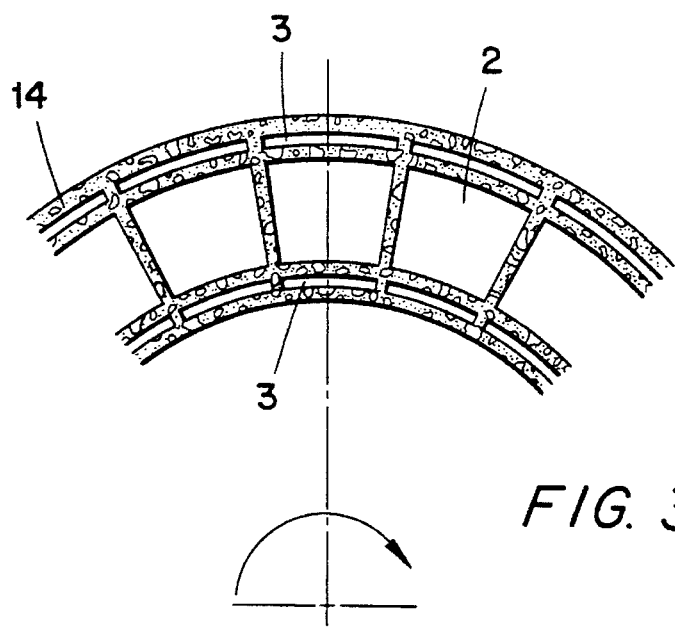
FIG. 3 is a partial cross-section of the rotor of FIG. 2.

In the pressure wave machine according to the invention, as may be seen from FIGS. 2 and 3, cooling air conduits 7 are present in the casing, on the one hand, and passages 3 for the cooling air are arranged in the rotor 1 radially inward and radially outward of the cells 2.

Because the method of cooling the rotor 1 of a pressure wave machine is particularly suitable for an asymmetrical pressure wave process, a pressure wave machine with a parallel flow process and operating with integrated constant volume combustion is explained as an example (FIG. 1).

The cooling air flows in against the flow direction of the working process on the side opposite to the inlet 8 for the fuel/air mixture and in the region of the outlet 9 for the low-pressure hot gases, cooling the rotor 1 convectively. The air is previously used for cooling the low-pressure outlet passage. The cooling air itself is now subjected to its own pressure wave process in the pressure wave machine. The cooling air is compressed and brought to rest by the pressure wave which is initiated by the closing edge of the outlet opening 9. During the constant volume phase which now follows, the cooling effect takes place by transient heat conduction in the gas. The pressure of the cooling air increases due to the heating during the constant volume combustion. This effect is further increased by the leakage gas flowing over from the cell 2. By this means, compensation is provided for the pressure loss due to cooling air leakage flowing toward the outside and the pressure loss may, in fact, be over-compensated. A higher pressure before the gas exchange initiates a stronger expansion wave which in turn supports the gas exchange. The heated cooling air subsequently flows out in the region of the air inlet 8 and can, because of its pressure level, only be mixed into the low-pressure outlet 9. This can take place either directly or by introduction into the internal space of the pressure wave machine casing (see FIG. 2). This, however, must then be associated with the low-pressure outlet 9 so that no excessive pressure can build up in the internal space.

The magnitude of the cooling effect can be controlled by throttling the cooling air flow and/or by changing the width of the cooling air inlet openings and the outlet openings 11. An asymmetrical axial temperature distribution is countered by the counterflow cooling principle.

Figure 4:
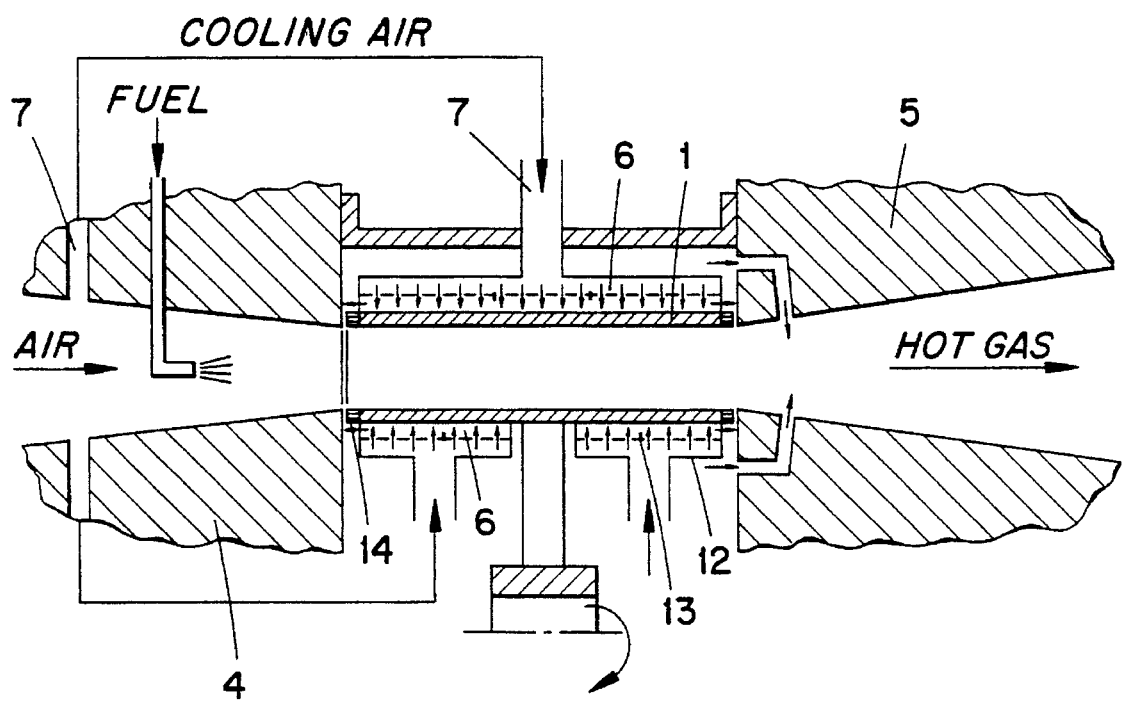
FIG. 4 is a partial longitudinal section of the pressure wave machine with sheet-metal guides for cooling air guidance at the inner periphery and outer periphery of the rotor.
Figure 5:
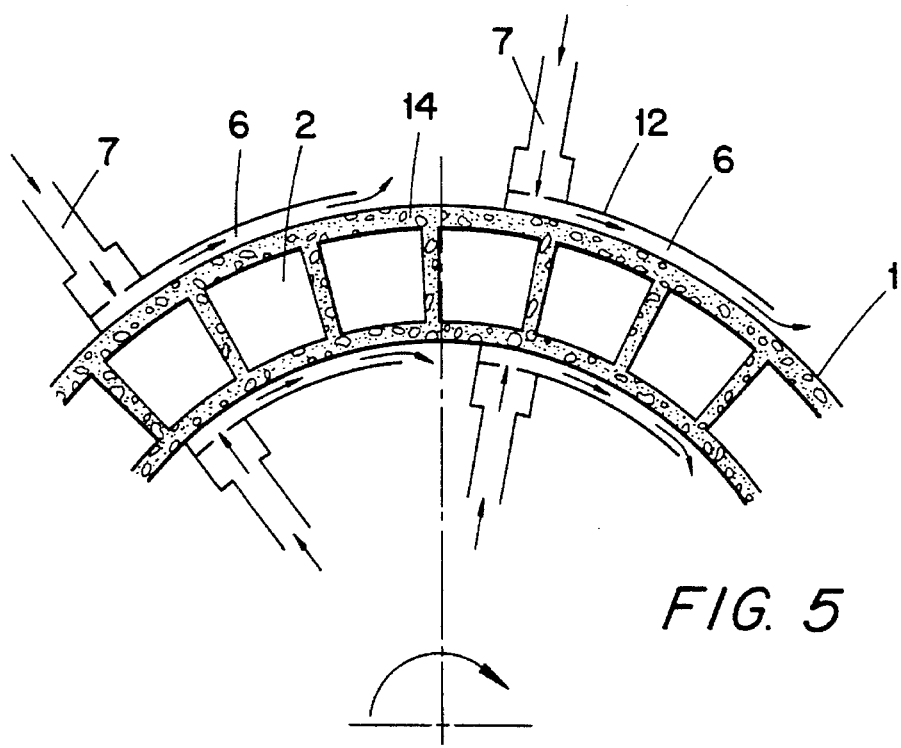
FIG. 5 is a partial cross-section of the rotor of FIG. 4.
Figure 6:
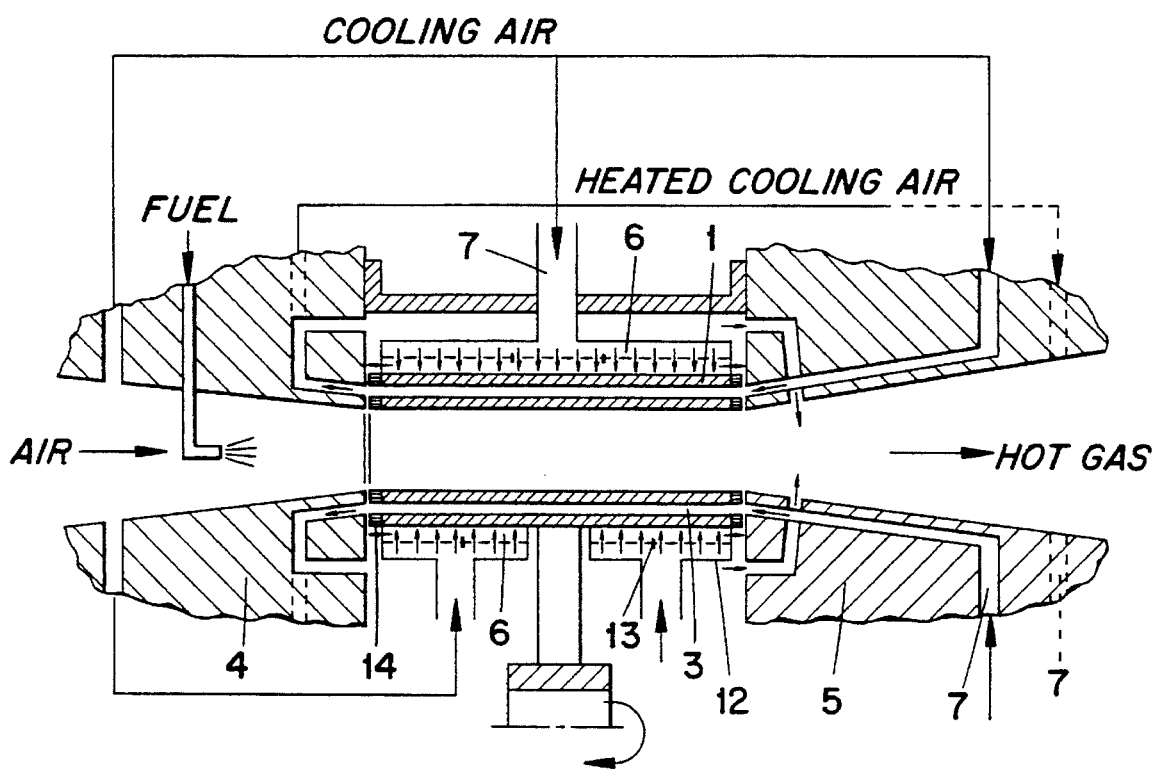
FIG. 6 is a partial longitudinal section of the pressure wave machine having cooling passages in the rotor as in FIG. 2, and sheet metal cooling air guides as in FIG. 4.

Another embodiment example is shown in FIGS. 4 and 5. It may be seen that in this case, the rotor 1 of the pressure wave machine is surrounded at the inside and the outside by at least one sheet-metal guide 12 so that a cooling passage 6 is formed completely or partially around the rotor. A small part of the entering air is branched off before the admixture of fuel, is led into the rotor internal space and is introduced into the cooling passage 6. The magnitude of the cooling effect is controlled by the cooling air flow and by the outer surface area of the rotor 1 acted on by the cooling air. The casing internal space of the pressure wave machine must, in this case, be connected to the low-pressure outlet 9 so that no additional pressure can build up in the internal space. Adaptation of the cooling effect to the axial temperature distribution takes place by the additional installation of separating webs 13. This embodiment variant can, of course, be associated with the cooling by the passages 3, described above as shown in FIG. 6, but both embodiment forms can also be separately used for the rotor cooling.

Good sealing of the rotor 1 relative to the casing is an important precondition for good functioning of the cooling and also of the pressure wave machine as a whole. For this purpose, very small axial clearances must be maintained. The sealing effect can be further improved by a special geometrical configuration of the gap. Because both radial and tangential pressure differences arise in the pressure wave machine, a honey-comb seal 14 is the most suitable.

If, for technical cooling reasons, cooling air is required at a higher pressure, part of the entering air can remain free of fuel and cooling air can be extracted after precompression by the pressure wave. The heated cooling air can then be mixed again with the precompressed air. Although, in this case, the work for the compression in the compression wave must be expended twice, the cooling air does take part in the subsequent high-pressure process so that a thermo-dynamic process gain can be achieved.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pressure wave machine with integrated combustion, comprising:

a casing having two side parts;

a rotor which rotates between the two side parts, having cells in which an ignition and combustion process takes place repetitively, and cooling passages for guiding cooling air to radially inner and radially outer walls of the cells;

the casing having cooling air conduits to guide cooling air to the cooling passages and guide heated cooling air from the cooling passages; and a duct connecting an internal space of the pressure wave machine casing to an outlet opening for low-pressure hot gas.

2. The pressure wave machine as claimed in claim 1, wherein the cooling passages are formed in the radially inner and radially outer walls of the rotor.

3. The pressure wave machine as claimed in claim 2, further comprising a sheet metal guide surrounding the radially inner and radially outer walls of the rotor.

4. The pressure wave machine as claimed in claim 3, wherein separating webs are arranged in the cooling passages.

5. The pressure wave machine as claimed in claim 1, wherein the cooling passages are formed by a sheet metal guide surrounding the radially inner and radially outer walls of the rotor.

6. A method for cooling the rotor of a pressure wave machine, a casing comprising two side parts and a rotor which rotates between the two side parts, the rotor having cells in which an ignition and combustion process takes place repetitively and cooling passages for guiding cooling air to radially inner and radially outer walls of the cells, the casing having cooling air conduits to guide cooling air to the cooling passages and guide heated cooling air from the cooling passages, and an internal space of the pressure wave machine casing being connected to an outlet opening for low-pressure hot gas, the method comprising the steps of:

diverting a portion of air entering the pressure wave machine before a location where fuel is introduced;

guiding the diverted air through the cooling air conduits; and subsequently guiding the diverted air through the cooling passages.

7. The method as claimed in claim 6, comprising controlling a cooling effect by at least one of throttling the cooling air flow and by changing a width of the cooling air inlet openings and outlet openings.

8. The method as claimed in claim 6, wherein the cooling air is guided through cooling air passages formed in the radially inner and radially outer walls of the rotor and the cooling air is subjected to a pressure wave process.

9. The method as claimed in claim 8, wherein the cooling air is extracted after precompression by the pressure wave machine and, after flowing through the passages, the cooling air is then mixed again, as heated cooling air, with the entering air.

10. The method as claimed in claim 8, further comprising:

guiding a portion of the diverted air into cooling passages formed by sheet metal guides surrounding radial inner and radial outer walls of the rotor.

11. The method as claimed in claim 6, wherein the cooling air is guided into cooling air passages formed by sheet metal guides positioned radially inward and radially outward of the rotor.

* * * * *